(12) United States Patent
Yoon et al.

(10) Patent No.: US 9,983,302 B2
(45) Date of Patent: May 29, 2018

(54) SYSTEM AND METHOD FOR CORRECTING VEHICLE TRACING-POSITION OF RADAR SENSOR USING LASER SCANNER

(71) Applicant: HYUNDAI MOBIS CO., LTD., Seoul (KR)

(72) Inventors: Sung Jun Yoon, Busan (KR); Sung Dae Jung, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 411 days.

(21) Appl. No.: 14/708,731

(22) Filed: May 11, 2015

(65) Prior Publication Data

US 2016/0187465 A1 Jun. 30, 2016

(30) Foreign Application Priority Data

Dec. 30, 2014 (KR) ........................ 10-2014-0193493

(51) Int. Cl.
| | |
|---|---|
| *G01S 13/06* | (2006.01) |
| *G01S 13/86* | (2006.01) |
| *G01S 17/42* | (2006.01) |
| *G01S 17/93* | (2006.01) |
| *G01S 7/40* | (2006.01) |
| *G01S 13/42* | (2006.01) |
| *G01S 13/87* | (2006.01) |
| *G01S 13/93* | (2006.01) |

(52) U.S. Cl.
CPC .......... *G01S 13/865* (2013.01); *G01S 7/4026* (2013.01); *G01S 13/42* (2013.01); *G01S 13/87* (2013.01); *G01S 13/931* (2013.01); *G01S 17/42* (2013.01); *G01S 17/936* (2013.01); *G01S 2007/403* (2013.01); *G01S 2013/9375* (2013.01)

(58) Field of Classification Search
CPC ........ G01S 13/42; G01S 13/865; G01S 13/87; G01S 13/931; G01S 17/42; G01S 17/936; G01S 2007/403; G01S 2013/9375; G01S 7/4026; G07C 9/00182; H04N 7/186
USPC .......................................................... 342/54
See application file for complete search history.

(56) References Cited

U.S. PATENT DOCUMENTS

2014/0277897 A1* 9/2014 Saiz ...................... B60W 10/06
701/23

FOREIGN PATENT DOCUMENTS

| JP | 2009-42181 A | 2/2009 |
|---|---|---|
| JP | 2010-73007 A | 4/2010 |
| KR | 20130130658 A | 12/2013 |

* cited by examiner

*Primary Examiner* — Timothy A Brainard
(74) *Attorney, Agent, or Firm* — NSIP Law

(57) ABSTRACT

Provided are a system and a method for correcting a tracing-position of another vehicle sensed by a radar sensor using a laser scanner, which compare an unspecific tracing position of the radar sensor sensing another vehicle and a contour point acquired by a laser scanner and correct the tracing position of the radar sensor with a position most approximate to the vehicle in the contour point. Therefore, the radar sensor sensing an object in the vicinity of the vehicle recognizes a tracing position of another vehicle to facilitate design of a radar sensor based system.

13 Claims, 6 Drawing Sheets

SYSTEM AND METHOD FOR CORRECTING VEHICLE TRACING-POSITION OF RADAR SENSOR USING LASER SCANNER

CROSS-REFERENCE TO RELATED APPLICATIONS

This application claims priority under 35 U.S.C. § 119 to Korean Patent Application No. 10-2014-0193493, filed on Dec. 30, 2014, in the Korean Intellectual Property Office, the disclosure of which is incorporated herein by reference in its entirety.

TECHNICAL FIELD

The present invention relates to a system and a method for correcting a vehicle tracing-position of another vehicle sensed by a radar sensor of a vehicle, and particularly, to a system and a method for correcting a vehicle tracing-position of a radar sensor which senses another vehicle and corrects an unspecific traced position to a specific position to remedy a disadvantage that a tracing-position of another vehicle cannot be accurately known when a radar sensor traces another vehicle.

BACKGROUND

A research into a system that senses the vicinity of a vehicle has been continuously in progress for driving convenience and safety of a vehicle driver and as a sensor that senses the vicinity of the vehicle, a radar sensor has been used, which is more excellent than a sensor such as an infrared sensor or an ultrasonic sensor in sensing performance.

However, the radar sensor has an advantage of accurately sensing a surrounding object, but the radar sensor cannot accurately know the kind of the sensed object and traces an unspecific point of the sensed object.

In order to remedy the disadvantage of the radar sensor, as the related art that analyzes the object sensed through the radar sensor, Korean Patent Unexamined Publication No. 10-2013-0130658 (Title of the invention: Sensing System Using Radar, hereinafter, referred to as "Related Art 1") is provided.

Related Art 1 includes a plurality of radars receiving a reflected radar signal; a camera acquiring an image of an object sensed by the radar; an analysis unit analyzing object information received by the radar and object information of the acquired image; a determination unit determining an object sensed by using the information of the analysis unit; and an electronic control unit performing a predetermined vehicle control based on the determined object.

Therefore, according to Related Art 1, the object can be determined more accurately, but although the type of the object is determined by analyzing the image acquired through the camera, an accurate position of the object traced by the radar cannot still be recognized.

Since the accurate position of the object traced by the radar cannot be recognized, there are many difficulties in designing a system base on the radar sensor.

SUMMARY

The present invention has been made in an effort to provide a system and a method for correcting a vehicle tracing-position of a radar sensor using a laser scanner, which allows the radar sensor to trace a specific position of a vehicle by correcting a tracing position of another vehicle sensed by the radar sensor by using a contour point formed by a laser scanner of the vehicle' scanning another vehicle.

An exemplary embodiment of the present invention provides a system for correcting a vehicle tracing-position of a radar sensor using a laser scanner including: a sensing information acquiring unit acquiring information regarding a tracing position of another vehicle sensed by the radar sensor of the vehicle and a contour point formed when a laser scanner of the vehicle scans another vehicle; and a tracing-position correcting unit comparing the tracing position of another vehicle and the contour point to correct the tracing position of another vehicle with a position most approximate to the vehicle among positions included in the contour point.

The tracing-position correcting unit may verify whether the contour point including the tracing position of another vehicle is present and corrects the tracing position of another vehicle, calculate a distance between the contour point and the vehicle when the tracing position of another vehicle is included in the contour point, and measure a distance between the vehicle and the contour point by using the radar sensor.

The tracing-position correcting unit may compare the tracing position of another vehicle and the contour point at a predetermined time interval and correct the tracing position of another vehicle.

The sensing information acquiring unit may acquire information on the contour point from the laser scanner when receiving the tracing position of another vehicle sensed by the radar sensor and match time synchronizations of an output signal of the radar sensor and an output signal of the laser scanner.

Another exemplary embodiment of the present invention provides a method for correcting a vehicle tracing-position of a radar sensor using a laser scanner, the method including: acquiring, by the radar sensor and a laser scanner of the vehicle, a signal to sense and output another vehicle; comparing a tracing position of another vehicle sensed by the radar sensor and a contour point formed when the laser scanner scans another vehicle; and correcting the tracing position of another vehicle with a position most approximate to the vehicle among positions included in the contour point.

According to exemplary embodiments of the present invention, an unspecific tracing position of another vehicle sensed by a radar sensor of a vehicle is corrected to a specific position by using a contour point by a laser scanner's scanning another vehicle to allow the radar sensor of the vehicle to trace the specific position, and as a result, a system and a method for correcting a vehicle tracing-position of a radar sensor using a laser scanner can be used in designing a system based on the radar sensor.

Other features and aspects will be apparent from the following detailed description, the drawings, and the claims.

DETAILED DESCRIPTION OF EMBODIMENTS

Various advantages and features of the present invention and methods accomplishing them will become apparent from embodiments described below in detail with reference to the accompanying drawings. However, the present invention is not limited to exemplary embodiments to be disclosed below, but various forms different from each other may be implemented. The exemplary embodiments are merely intended to make the disclosure of the present invention complete and to completely notify the person with ordinary skill in the art, to which the present invention belongs, of the scope of the invention, and the present invention is only defined by the scope of the claims.

Meanwhile, the terms used in the present specification are for explaining the embodiments rather than limiting the present invention. Unless particularly stated otherwise in the present specification, a singular form also includes a plural form. The meaning of "comprises" and/or "comprising" used in this specification does not exclude the existence or addition of aforementioned constituent elements, steps, operations, and/or device, and one or more other constituent elements, steps, operations, and/or devices. Hereinafter, exemplary embodiments of the present invention will be described in detail with reference to the accompanying drawings.

Figure 1:
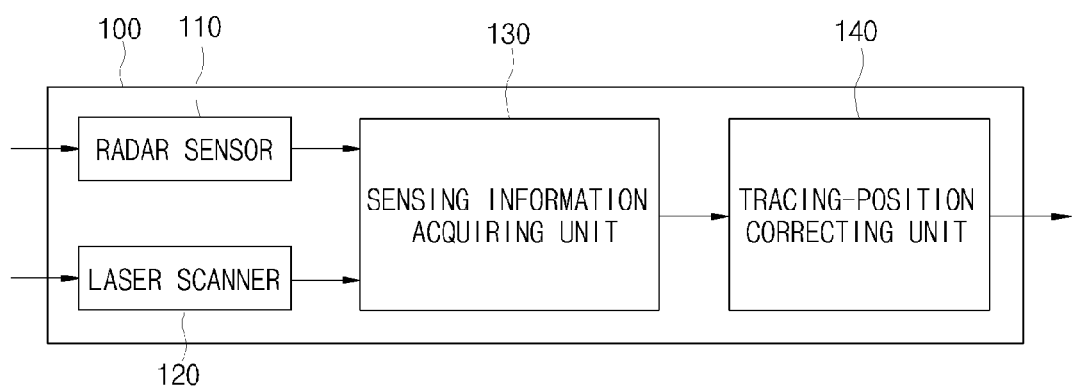
FIG. 1 is a block diagram illustrating a structure of a system for correcting a vehicle tracing-position of a radar sensor using a laser scanner according to an exemplary embodiment of the present invention.

FIG. 1 is a block diagram illustrating a structure of a system 100 for correcting a vehicle tracing-position of a radar sensor using a laser scanner according to an exemplary embodiment of the present invention.

The system 100 for correcting a vehicle tracing-position of a radar sensor using a laser scanner according to the exemplary embodiment of the present invention includes a radar sensor 110, a laser scanner 120, a sensing information acquiring unit 130, and a tracing-position correcting unit 140.

The radar sensor 110 and the laser scanner 120 are mounted on a vehicle to sense a surrounding object and transfer sensed information to the sensing information acquiring unit 130.

The sensing information acquiring unit 130 receives the information sensed from the radar sensor 110 and the laser scanner 120, receives Lateral Position, Longitudinal Position, Lateral Velocity, Longitudinal Velocity, Tracking MSG, Detection MSG, and the like which are information output by the radar sensor 110, and receives Scan Point, Contour MSG, Box Center, Header, Trailer, and the like which are information output by the laser scanner 120.

Since input/output cycles of the radar sensor 110 and the laser scanner 120 are different from each other, the sensing information acquiring unit 130 matches time syncs between the sensors at the corresponding time and transfers the acquired information to the tracing-position correcting unit 140.

The tracing-position correcting unit 140 corrects a tracing position of another vehicle sensed by the radar sensor 110 of the vehicle to a specific position (for example, a position most approximate to the vehicle) by using the information received from the sensing information acquiring unit 130.

In detail, the tracing-position correcting unit 140 compares the tracing position of another vehicle sensed by the radar sensor 110 and a contour point formed by the laser scanner 120's scanning another vehicle to correct the tracing position of the radar sensor 110 according to a comparison result.

The tracing-position correcting unit 140 may determine whether an object scanned from the contour point acquired by the laser scanner 120 is the vehicle and when the object is determined as the vehicle, the tracing-position correcting unit 140 verifies a signal of the radar signal 110 recognized to trace the corresponding vehicle.

The tracing-position correcting unit 140 detects the contour point most approximate to the vehicle by calculating a distance between the vehicle and the contour point and corrects the tracing position of the verified signal of the radar sensor 110 to the detected contour point.

In this case, since the position most approximate to the vehicle as the vehicle moves, the tracing position of the radar sensor 110 and the contour point acquired by the laser scanner 120 are compared with each other at a predetermined tine interval to correct the tracing position of the radar sensor 110.

Hereinafter, an exemplary embodiment of correcting the tracing position of another vehicle sensed by the radar sensor 110 according to the present invention will be described with reference to FIGS. 2 to 5.

Figure 2:
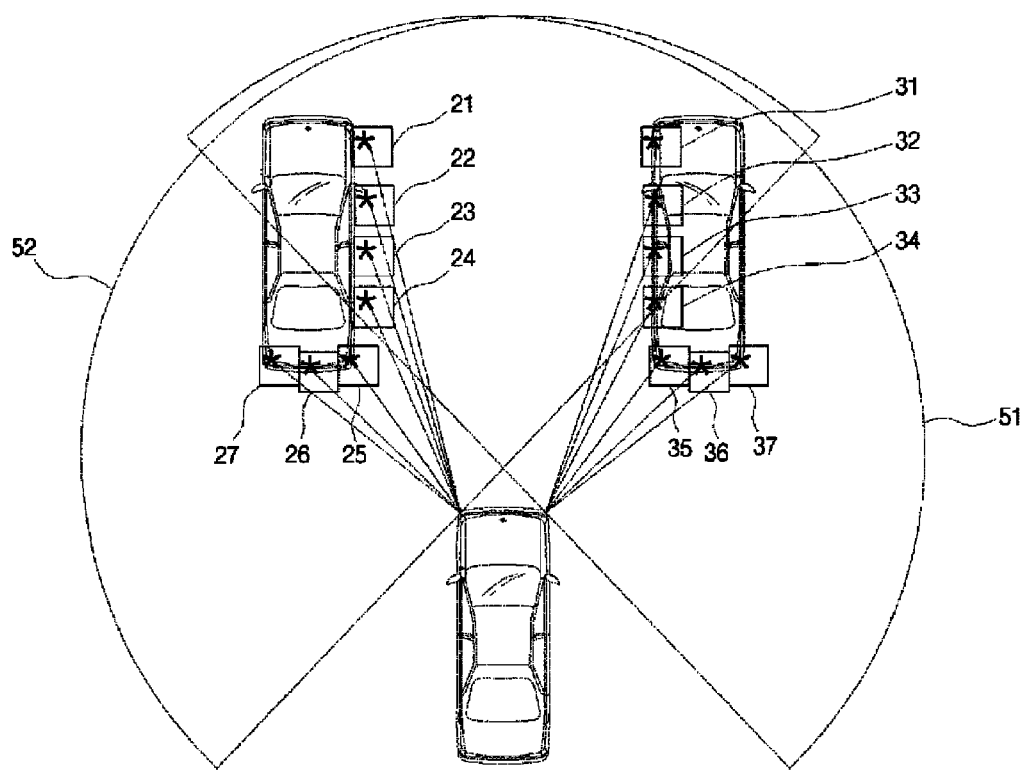
FIGS. 2 to 5 are diagrams for describing an exemplary embodiment in which the system for correcting a vehicle tracing-position of a radar sensor using a laser scanner according to the exemplary embodiment of the present invention corrects the vehicle tracing-position of the radar sensor.
Figure 3:
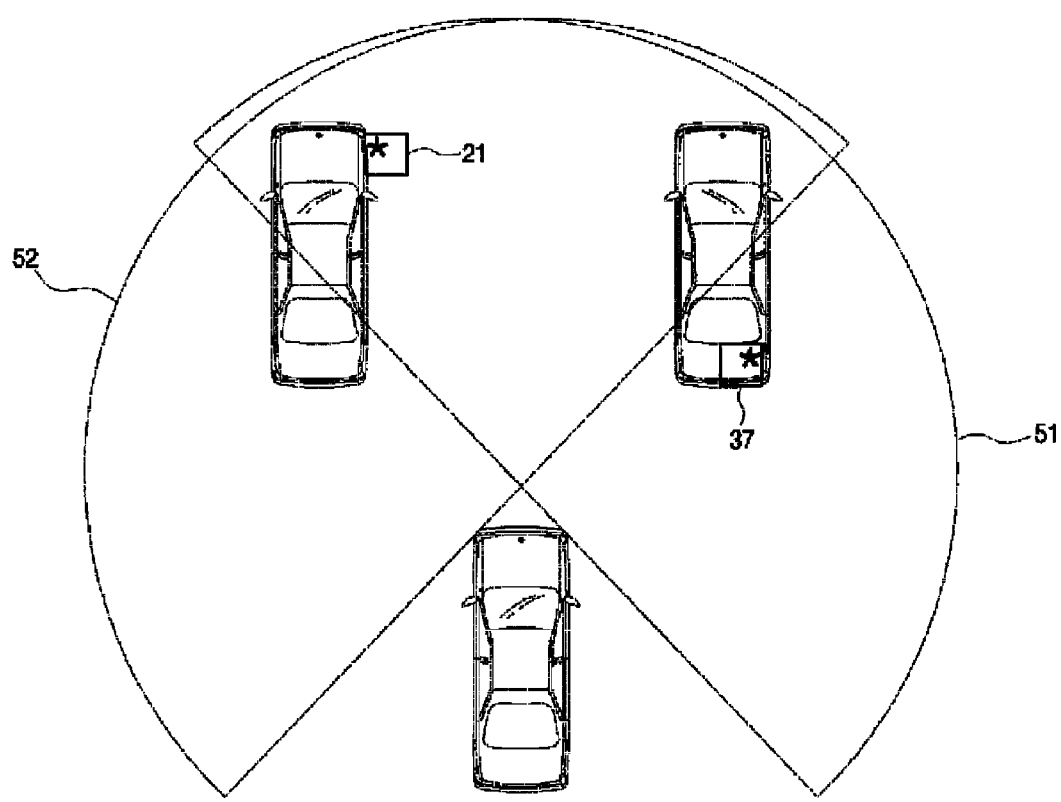

FIGS. 2 and 3 illustrate that the radar sensor 110 of the vehicle senses another vehicle and illustrate an area 51 sensed by a right radar sensor and an area 52 sensed by a left radar sensor.

As illustrated in FIG. 2, the radar sensor 110 senses various points 21-27 and 31-37 of another vehicle and traces any one point of the sensed points and a point where the radar sensor 110 traces another vehicle may be a front part 21 of the vehicle or a rear bumper 37 of the vehicle as illustrated in FIG. 3.

Therefore, according to the present invention, the tracing position of the radar sensor 110 may be corrected by using the laser scanner 120 in order to solve a problem that it is difficult to design the system based on the radar sensor 110 by the radar sensor 110's tracing an unspecific position of the vehicle.

Figure 4:
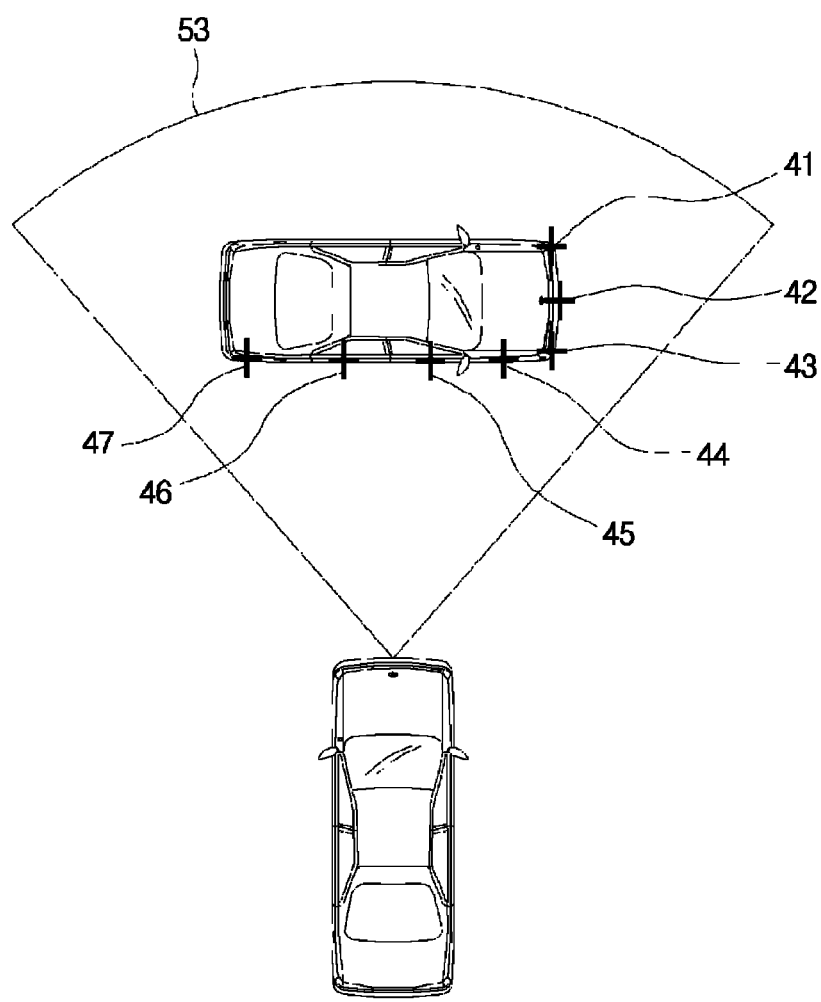

FIG. 4 illustrates contour points 41-47 formed when the laser scanner 120 scans another vehicle.

As illustrated in FIG. 4, since the contour point forms a contour of the vehicle, a shape of the vehicle may be known in any degree and the vehicle tracing-position of the radar sensor 110 may be corrected by using the shape of the vehicle.

Figure 5:
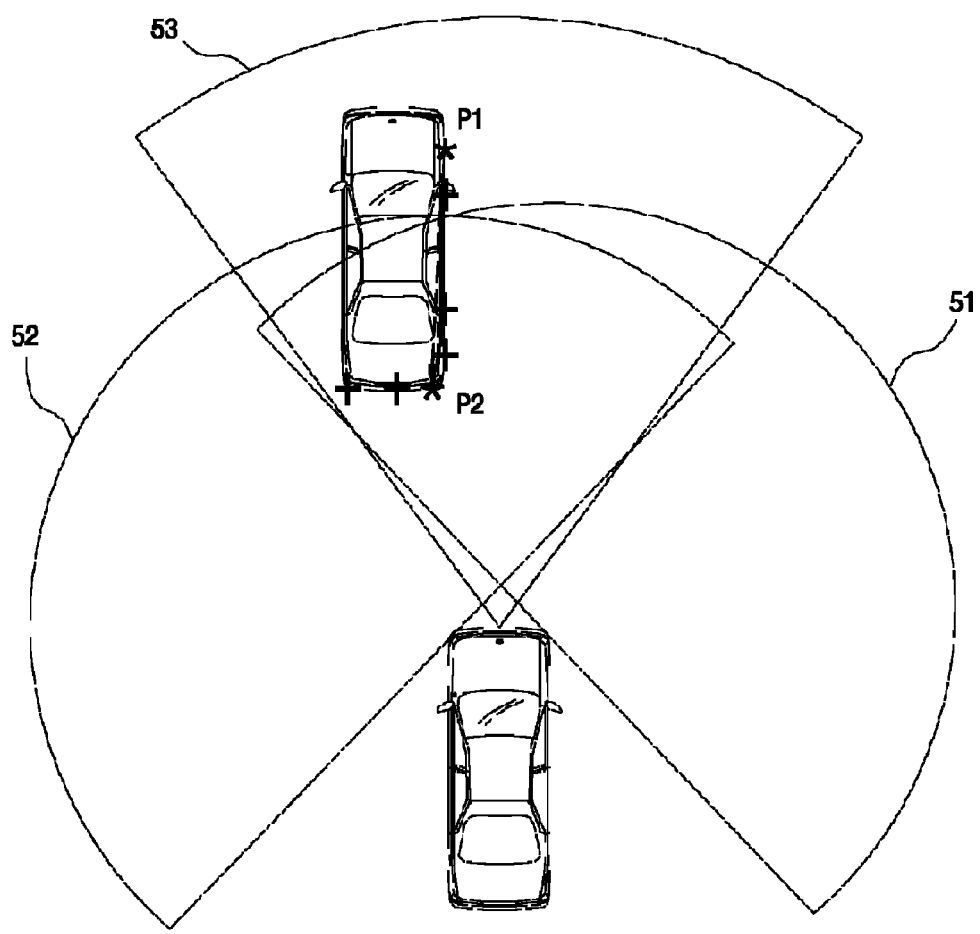

FIG. 5 illustrates an exemplary embodiment in which the tracing position of the radar sensor 110 illustrated in FIG. 3 is corrected by using the contour point acquired by the laser scanner 120 illustrated in FIG. 4.

As illustrated in FIG. 5, when the radar sensor 110 of the vehicle traces point P1 which is a front part of another vehicle, the tracing-position correcting unit 140 detects the contour point of the vehicle traced by the radar sensor 110 among the contour points of another vehicle acquired by the laser scanner 120.

That is, it may be determined whether the object is the vehicle through the acquired contour point and when the object is determined as the vehicle, a signal of the radar sensor 110 that traces the corresponding vehicle may be detected.

When matching the signal of the radar sensor 110 and the contour point is completed, a distance between the vehicle and the contour point is calculated and the tracing position of the signal of the radar sensor 110 is corrected with point P2 which is the contour point most approximate to the vehicle.

Figure 6:
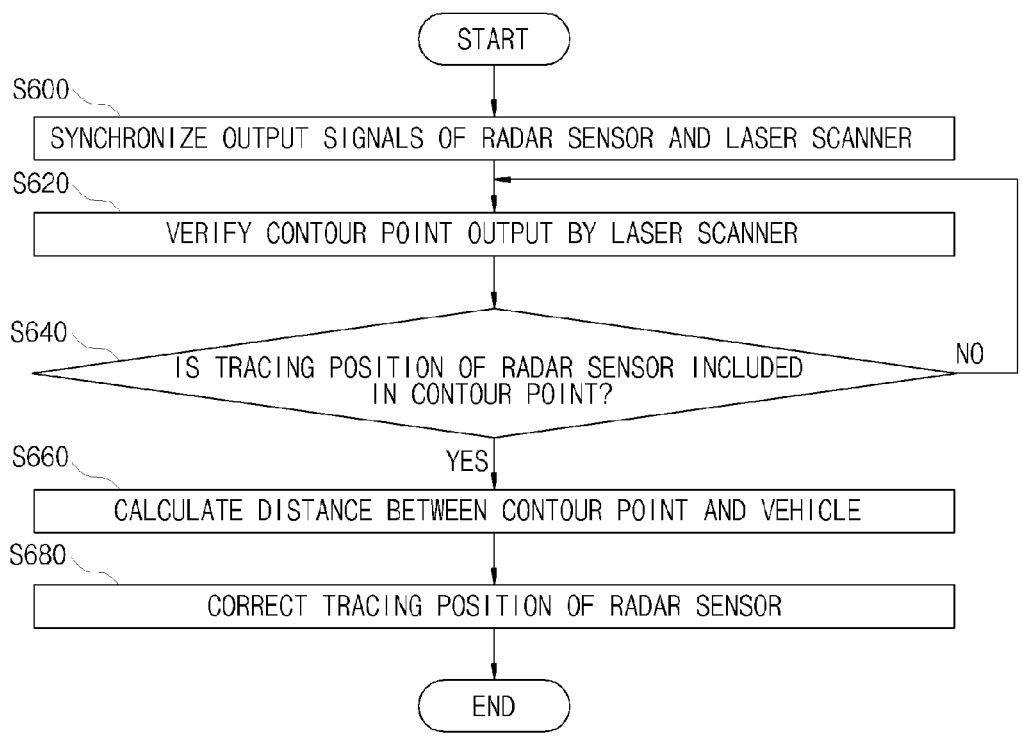
FIG. 6 is a flowchart illustrating a process of a method for correcting a vehicle tracing-position of a radar sensor using a laser scanner according to another exemplary embodiment of the present invention.

FIG. 6 is a flowchart illustrating a process of a method for correcting a vehicle tracing-position of a radar sensor using a laser scanner according to another exemplary embodiment of the present invention.

The system for correcting a vehicle tracing-position of a radar sensor using a laser scanner according to the exemplary embodiment of the present invention receives information output from a radar sensor and a laser scanner mounted on the vehicle and synchronizes output signals of the radar sensor and the laser scanner because input/output cycles of both sensors are different from each other (S600).

A contour point formed when the laser scanner scans another vehicle is verified (S620) and it is verified whether a tracing position of another vehicle sensed by the radar sensor is included in the verified contour point (S640).

The tracing position sensed by the radar sensor may not be accurately specified, but the contour of the vehicle may be verified through the contour point when the laser scanner scans another vehicle and a signal of the radar sensor determined to trace the vehicle of which the contour is verified is acquired.

A distance between the vehicle and the contour point is calculated (S660) and the tracing position of another vehicle sensed by the radar sensor is corrected with the shortest contour point (S680).

Therefore, the unspecific position of another vehicle sensed by the radar sensor of the vehicle according to the present invention is corrected with the specific position to verify the position traced by the radar sensor, thereby facilitating design of the radar sensor based system.

Various exemplary embodiments of the present invention have been just exemplarily described, and various changes and modifications may be made by those skilled in the art to which the present invention pertains without departing from the scope and spirit of the present invention. Accordingly, the embodiments disclosed herein are intended not to limit but to describe the technical spirit of the present invention, and the scope of the spirit of the present invention is not limited to the embodiments. The scope of the present invention may be interpreted by the appended claims and all the technical spirits in the equivalent range thereto are intended to be embraced by the claims of the present invention.

What is claimed is:

1. A apparatus for correcting a vehicle tracing-position of a radar sensor using a laser scanner, the apparatus comprising:
   a sensing information acquiring unit acquiring information regarding a tracing position of another vehicle sensed by the radar sensor of the vehicle and a contour point formed in response to the laser scanner of the vehicle scanning the another vehicle; and
   a tracing-position correcting unit comparing the tracing position of the another vehicle and the contour point to correct the tracing position of the another vehicle with a position most approximate to the vehicle among positions included in the contour point.

2. The apparatus of claim 1, wherein the tracing-position correcting unit verifies whether the contour point including the tracing position of the another vehicle is present and corrects the tracing position of the another vehicle.

3. The apparatus of claim 1, wherein the tracing-position correcting unit calculates a distance between the contour point and the vehicle when the tracing position of the another vehicle is included in the contour point.

4. The apparatus of claim 1, wherein the tracing-position correcting unit measures a distance between the vehicle and the contour point by using the radar sensor.

5. The apparatus of claim 1, wherein the tracing-position correcting unit compares the tracing position of the another vehicle and the contour point at a predetermined time interval and corrects the tracing position of the another vehicle.

6. The apparatus claim 1, wherein the sensing information acquiring unit acquires information on the contour point from the laser scanner when receiving the tracing position of the another vehicle sensed by the radar sensor.

7. The apparatus of claim 1, wherein the sensing information acquiring unit matches time synchronizations of an output signal of the radar sensor and an output signal of the laser scanner.

8. A method for correcting a vehicle tracing-position of a radar sensor using a laser scanner, the method comprising:
   acquiring, by the radar sensor and the laser scanner of the vehicle, a signal to sense and output information about another vehicle;
   comparing a tracing position of the another vehicle sensed by the radar sensor and a contour point formed in response to the laser scanner scanning the another vehicle; and
   correcting the tracing position of the another vehicle with a position most approximate to the vehicle among positions included in the contour point.

9. The method of claim 8, wherein in the correcting of the tracing position of the another vehicle with a position most approximate to the vehicle among positions included in the contour point, a distance is calculated between the contour point and the vehicle and the tracing position of the another vehicle is corrected when the tracing position of the another vehicle is included in the contour point.

10. The method of claim 8, wherein in the correcting of the tracing position of the another vehicle with a position most approximate to the vehicle among positions included in the contour point, the tracing position of the another vehicle and the contour point are compared at a predetermined time interval and the tracing position of the another vehicle is corrected.

11. The method of claim 8, wherein the correcting of the tracing position of the another vehicle with a position most approximate to the vehicle among positions included in the contour point includes calculating the distance between the vehicle and the contour point by using the radar sensor.

12. The method of claim 8, wherein in the comparing of a tracing position of the another vehicle sensed by the radar sensor and a contour point formed when the laser scanner scans the another vehicle, it is verified whether the tracing position of the another vehicle sensed by the radar sensor is included in the contour point.

13. The method of claim 8, wherein the acquiring of, by the radar sensor and a laser scanner of the vehicle, a signal to sense and output information about the another vehicle includes matching time synchronizations of an output signal of the radar sensor and an output signal of the laser scanner.

* * * * *